United States Patent [19]

Kaliski, Jr.

[11] Patent Number: 5,633,929
[45] Date of Patent: May 27, 1997

[54] CRYPTOGRAPHIC KEY ESCROW SYSTEM HAVING REDUCED VULNERABILITY TO HARVESTING ATTACKS

[75] Inventor: Burton S. Kaliski, Jr., San Carlos, Calif.

[73] Assignee: RSA Data Security, Inc, Redwood City, Calif.

[21] Appl. No.: 529,156

[22] Filed: Sep. 15, 1995

[51] Int. Cl.⁶ .................................................. H04K 1/00
[52] U.S. Cl. ................................................ 380/23; 380/28
[58] Field of Search .......................... 380/23, 24, 25, 380/49, 28

[56] References Cited

U.S. PATENT DOCUMENTS 5,553,145  9/1996  Micali ......................... 380/30

OTHER PUBLICATIONS

"A Practical Zero–Knowledge Protocol Fitter to Security Microprocessor Minimizing Both Transmission and Memory", Guillou/Quisquater, CCETT, BP59, pp. 123–128.
"A New Approach to Software Key Escrow Encryption", Balenson et al., TIS Report #520, pp. 1–29.
"Zero–Knowledge Proofs of Identity", Feign, et al., Journal of Cryptology, 1988, pp. 77–94.

*Primary Examiner*—David C. Cain
*Attorney, Agent, or Firm*—Nixon & Vanderhye P.C.

[57] ABSTRACT

A public key escrow system is adapted to have a proof of knowledge protocol for a certificate. The certificate is signed with RSA and is proved using a protocol based on the Guillou-Quisquater proof of knowledge scheme, or other proof of knowledge protocol. Interactive and non-interactive protocols are disclosed.

20 Claims, 3 Drawing Sheets

CRYPTOGRAPHIC KEY ESCROW SYSTEM HAVING REDUCED VULNERABILITY TO HARVESTING ATTACKS

FIELD OF THE INVENTION

The invention relates to a public-key Cryptography system with key escrow encryption. More particularly, the invention relates to a method for preventing harvesting of information, especially a certificate for an escrow key, exchanged in the key escrow protocol. Preventing harvesting of information is achieved by using proof of knowledge techniques in the escrow verification protocol.

BACKGROUND OF THE INVENTION

Key escrow cryptography systems allow authorized parties to retrieve escrowed keys for encrypted communications from escrow and use them to obtain the authorized system user's current session key. An authorized party in possession of the session key can decrypt the user's intercepted communications. Authorized parties are considered to be law enforcement agencies, national security agencies, corporate managers or supervisors and others who at times need access to cryptography communications.

In a public key escrow cryptography system, each user member of the system has a public escrow key/private escrow key pair. The private escrow key member of the pair is divided into parts and the respective parts are deposited with two or more key escrow agents. A user member sends in each communication a law enforcement access field (LEAF) containing the current session key encrypted by the public escrow key corresponding to the combined private escrow key parts deposited with the escrow agents. In a law enforcement environment, a court order (for wiretapping or eavesdropping) is obtained by the law enforcement agency authorizing the key escrow agents to release the private escrow key parts. The law enforcement decryptor combines the key pads to produce the private escrow key and uses it to decrypt the law enforcement access field containing the session key being used in the current communication. With the session key thus obtained, the law enforcement agency can decipher the intercepted communication.

In the public key escrow cryptography system, the receiver (by convention called Bob) of the communication reconstructs the law enforcement access field to verify that the received law enforcement access field in the communication is valid and correct for the current encrypted message. This procedure counters single rogue attacks (an attack on the system by a rogue user), by indicating to the receiver that the communication is from a sender (by convention called Alice) who has included a law enforcement access field in the communication and is properly using the escrow protocol. In order for Bob to reconstruct the law enforcement access field, Alice includes in the communication an escrow verification string (EVS) encrypted with the current session key (the current session key is known to both Alice and Bob). The escrow string incudes Alice's public escrow key and a certificate for Alice's public escrow key in Alice's program. Only an authorized public escrow key should have a certificate, so if the signature verifies, Bob knows that the escrow agents have the corresponding private escrow key. Bob re-encrypts the session key with Alice's public escrow key and compares the result to the received law enforcement access field to see that they are the same.

Bob, or any other member with which Alice communicates can copy, i.e., harvest Alice's public escrow key and the certificate. With the certificate copy, Bob can impersonate Alice, by communicating with others using a LEAF formed with Alice's public escrow key which makes it appear to the law enforcement decryptor that Alice is involved in the communication. The law enforcement decryptor then monitors all of Alice's communications, a situation which causes Alice's communication to be subjected to unwarranted and unauthorized exposure. Bob can also harvest the certificates for may users and variably use certificates among the collection during subsequent communications to confuse law enforcement.

Encrypting the certificate with the session key protects it from eavesdroppers. However, Bob knows the session key and must see the certificate to verify that Alice's purported public escrow key is valid, so Bob automatically has the capability to harvest Alice's and other users' certificates, public escrow key and other information.

The public key escrow cryptography system and the harvesting attack is further described in an article entitled "A New Approach to Software Key Escrow Encryption" by Balenson et al (1994). This article also suggests a solution to the harvesting problem that involves splitting the session key and encrypting each part with one of the respective public keys of the two escrow agents. This procedure still uses a LEAF and an escrow verification string, but does not contain information that can be used by the receiver to impersonate the sender. However, the escrow agents are required to be on-line and involved with every decryption of a new session key.

SUMMARY OF THE INVENTION

The reason that harvesting is possible in the first instance is because Alice gives away too much information. Not only does Alice convince Bob that she has a valid escrow public key by showing Bob her certificate, Alice also enables Bob to transfer that knowledge to someone else. All Alice really needs to do is to convince Bob that she has a certificate for her public escrow key. Alice does not need to show Bob the certificate. By the application of interactive or non-interactive proof of knowledge techniques, Alice can prove to Bob that she knows the signature on the certificate, without revealing the signature or anything about the signature. As a result, no information is made available that can be harvested, whereby a user could be impersonated.

DETAILED DESCRIPTION OF THE INVENTION

Figure 1:
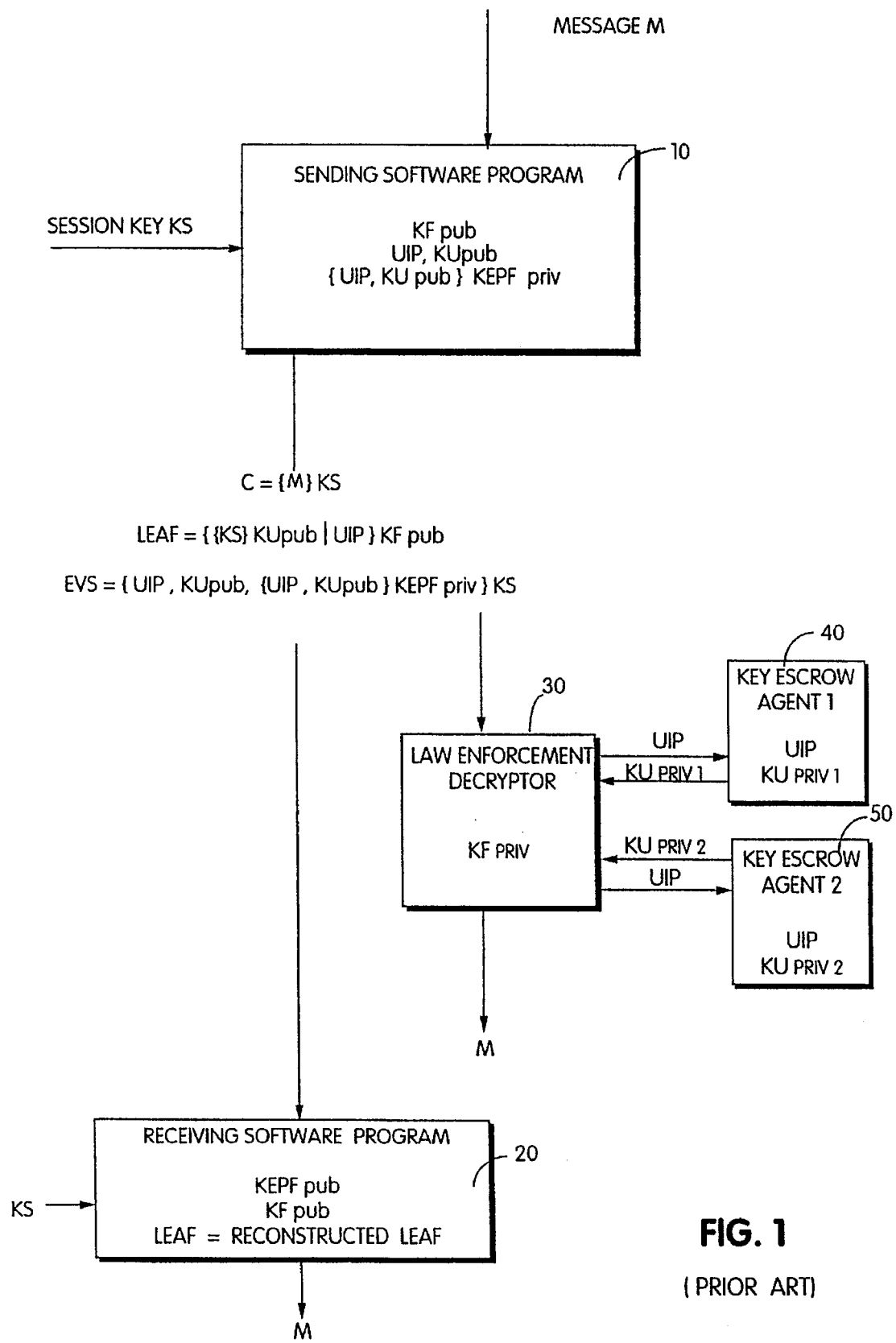
FIG. 1 illustrates a known public key escrow cryptography system.

FIG. 1 illustrates the protocol of the prior art public key escrow system. Unit 10 represents the sending software program, Alice, unit 20 the receiving software program, Bob, unit 30 the law enforcement decryptor, unit 40 a first key escrow agent and unit 50 a second key escrow agent.

In sending software program unit 10, M is the message to be encrypted with the session key KS being used by Alice the sender and Bob the receiver. Encrypting message M with the session key KS produces the encrypted message C, designated as C={M}KS. The sending software program includes a family public key KFpub, a program unique identifier UIP, a program unique public key KUpub and a UIP,KUpub parameter signed by KEPFpriv the key escrow programming facility private key {UIP, KU pub}KEPFpriv.

The signed parameter is the certificate for Alice's public key. Alice generates and sends a Taw enforcement access field LEAF by encrypting the session key KS under the program unique public key KUpub, concatenating the result with the program unique identifier UIP and encrypting the concatenated value with the family key KFpub. The LEAF is symbolized by LEAF={{KS}KUpub|UIP}KFpub.

Alice also sends an escrow verification string EVS. This string includes Alice's program unique identifier UIP, program unique public key KUpub, and the signature applied to these two parameters by the key escrow programming facility KEPFpriv. This string is encrypted with the session key KS. Thus EVS={UIP, KUpub,{UIP,KUpub}KEPFpriv}KS The receiving software program unit, unit 20, receives the encrypted message C={M}KS and decrypts it using the session key KS that it shares with the receiver. However, first the LEAF must be authenticated. This is done by decrypting the escrow verification string EVS and using parameters therein to reconstruct the LEAF. The receiving software includes the key escrow programming facility public key KEPFpub and the public family key KFpub. The receiving unit Bob uses the session key KS to decrypt EVS recovering Alice's UIP, KUpub and the signature. Using KEPFpub to verify the signature, Alice's UIP and KUpub are verified. Bob's program then recalculates the LEAF using KS, KFpub and Alice's UIP and KUpub and compares it with the received LEAF.

Law enforcement decryptor LED, unit 30, wanting to intercept and decrypt the encrypted message C has to recover the session key KS used to encrypt the message M. The session key KS is contained in the LEAF. With the family private key KFpriv provided to the LED, LED can decrypt the LEAF to retrieve {KS}KUpub|UIP. With UIP and a proper court order, LED can obtain from the respective escrow agents of units 40 and 50 the escrowed components KUpriv1 and KUpriv2 of Alice's program unique private key, combine them to form KUpriv and decrypt the session key KS. With the session key KS the law enforcement decryptor can decrypt encrypted message C to obtain message M.

The problem of harvesting as described above arises when the receiver Bob, a participating member in the key escrow system or network, records the information exchanged in the key escrow protocol and impersonates Alice using the recorded information. Specifically, Bob copies Alice's certificate for Alice's escrow public key {UIP, KUpub}KEPFpriv which Bob must see to verify that Alice's purported escrow public key KUpub is valid. With this information Bob can modify a copy of the product using a LEAF constructed with Alice's UIP and KUpub. By impersonating Alice in a future communication, Bob causes the LED to believe that Alice is involved in the communication.

The reason that harvesting is possible is that Alice gives away too much information. Not only does Alice convince Bob that Alice has a valid escrow public key; Alice also enables Bob to transfer this knowledge to someone else. But, all Alice really needs to do is convince Bob that Alice has a certificate for her escrow public key KUpub. Alice does not need to show Bob the certificate.

Turning to the invention, consider the procedure where the certificate is signed with RSA. The body of the certificate contains the escrow public key KUpub. The body is first hashed and the resulting hash is encrypted with the certifier's RSA private key. This provides a signature which is appended to the body of the certificate.

The certifier's RSA public key is known to Bob. Bob can then decrypt the signature to recover the hash. If the recovered hash matches the hash of the certificate's body, he accepts the certificate. In this procedure, the signature is sent to the receiver.

A way to do this, without sending the signature, is to use proof of knowledge techniques. All Alice needs to prove to Bob is that Alice knows the signature on the certificate, i.e., the RSA encryption of the hash of the certificate body. Using proof of knowledge techniques Alice can prove this without revealing anything about the signature itself.

Proof of knowledge techniques are known in verification schemes. See the article "A Practical Zero-knowledge Protocol Fitted to Security Microprocessor Minimizing Both Transmission and Memory" by Guillou and Quisquater, herein incorporated by reference into the disclosure.

The following protocol, based on the Guillou-Quisquater scheme, is an efficient way to achieve the proof of knowledge property. The parameters are as follows:

n - the certifier's RSA modulus
e - the RSA public exponent
h - the hash of the certificate body
S - the signature on the certificate.
Thus, the hash $h=S^e \bmod n$.

Figure 2:
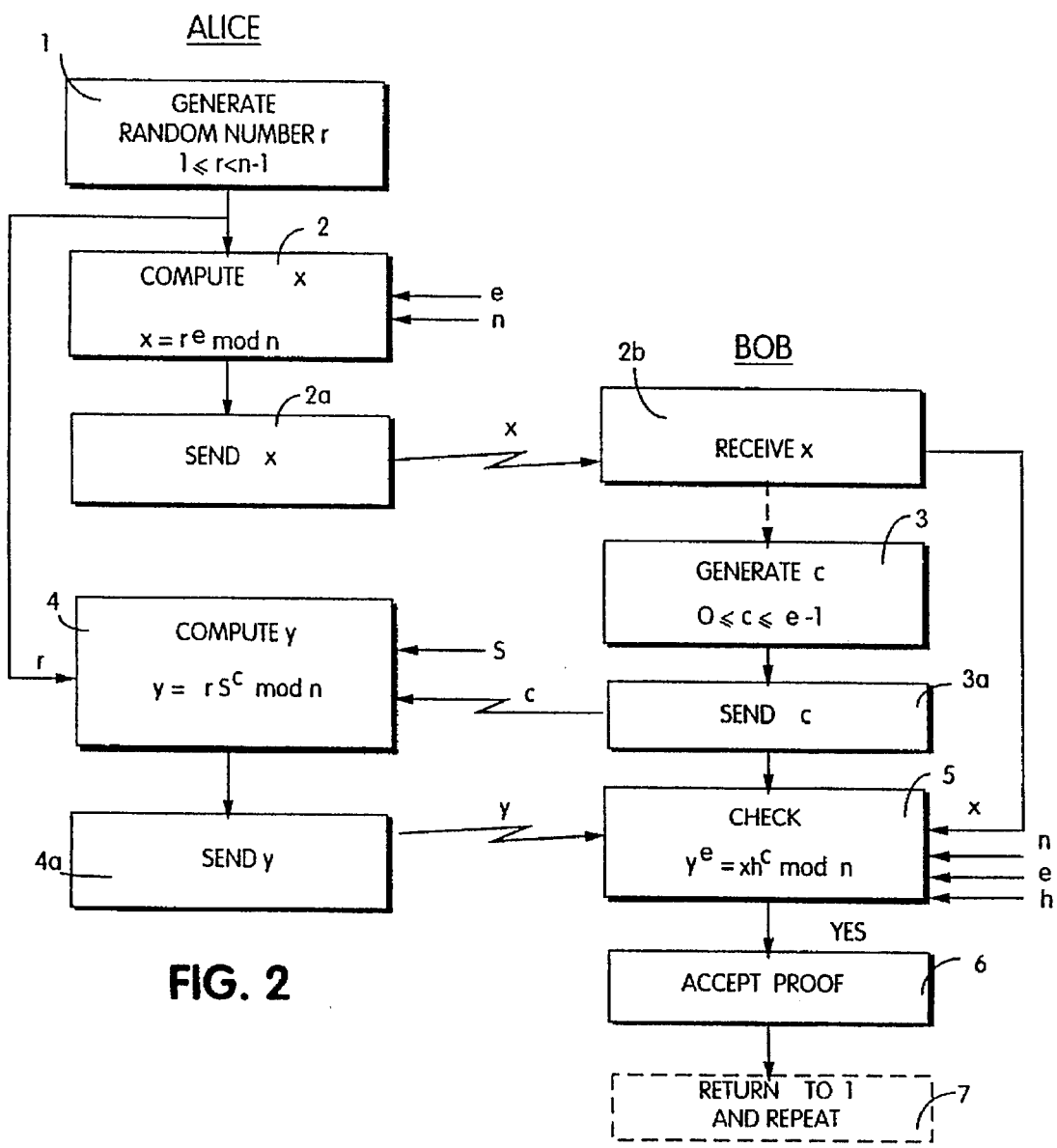
FIG. 2 is a flow chart illustrating a first proof of knowledge protocol.

Alice proves that she knows S in the following steps, and as illustrated in the flow chart of FIG. 2.
1. Alice generates a random number r between 1 and n-1.
2. Alice computes $x=r^e \bmod n$
2a. Alice sends x to Bob
3. Bob generates a random number c between 0 and e-1
3a. Bob sends c to Alice
4. Alice computes $y=rS^c \bmod n$
4a. Alice sends y to Bob
5. Bob checks the $y^e=xh^c \bmod n$
6. If so, Bob accepts proof.

Bob, having accepted proof of the signature, uses the session key KS to decrypt the escrow verification string EVS={UIP,KUpub}KS to obtain the parameters UIP, KUpub, uses these parameters to reconstruct the LEAF, and compares the reconstructed LEAF with the LEAF sent by Alice.

As Guillou and Quisquater show, if Alice does not know the signature S, Alice will be caught with probability 1-1/e (here e being the certifier's RSA public exponent). To increase the probability further, one can repeat the protocol as indicated in step 7. Replay is prevented, since Bob's challenge c is random. Furthermore, no matter what Bob sends to Alice, Bob cannot learn anything more about signature S than he could have learned by himself, with a similar amount of work (just a factor of e more). In particular, Bob cannot learn enough to impersonate Alice to someone else.

Figure 3A:
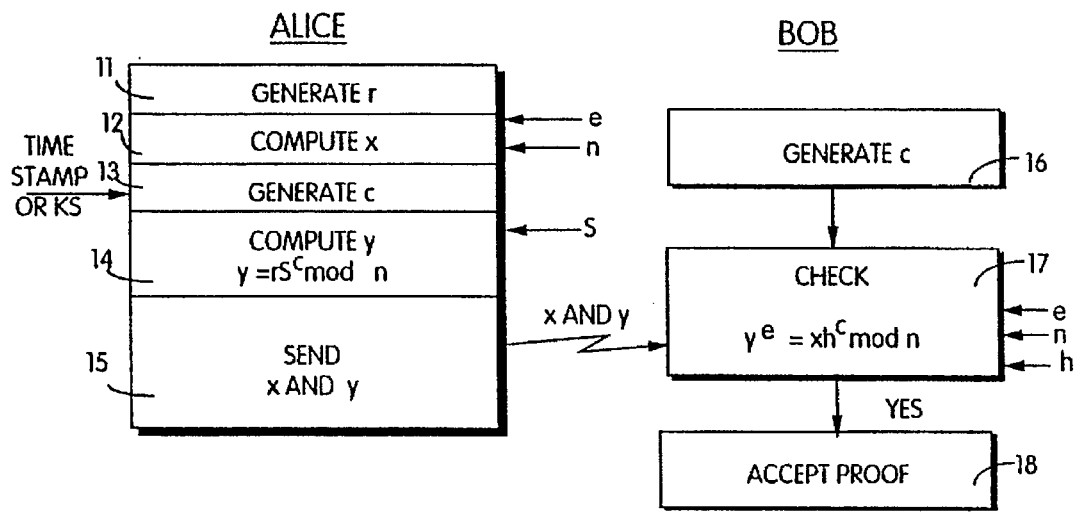
FIG. 3a is a flow chart illustrating a non-interactive proof of knowledge protocol.
Figure 3B:
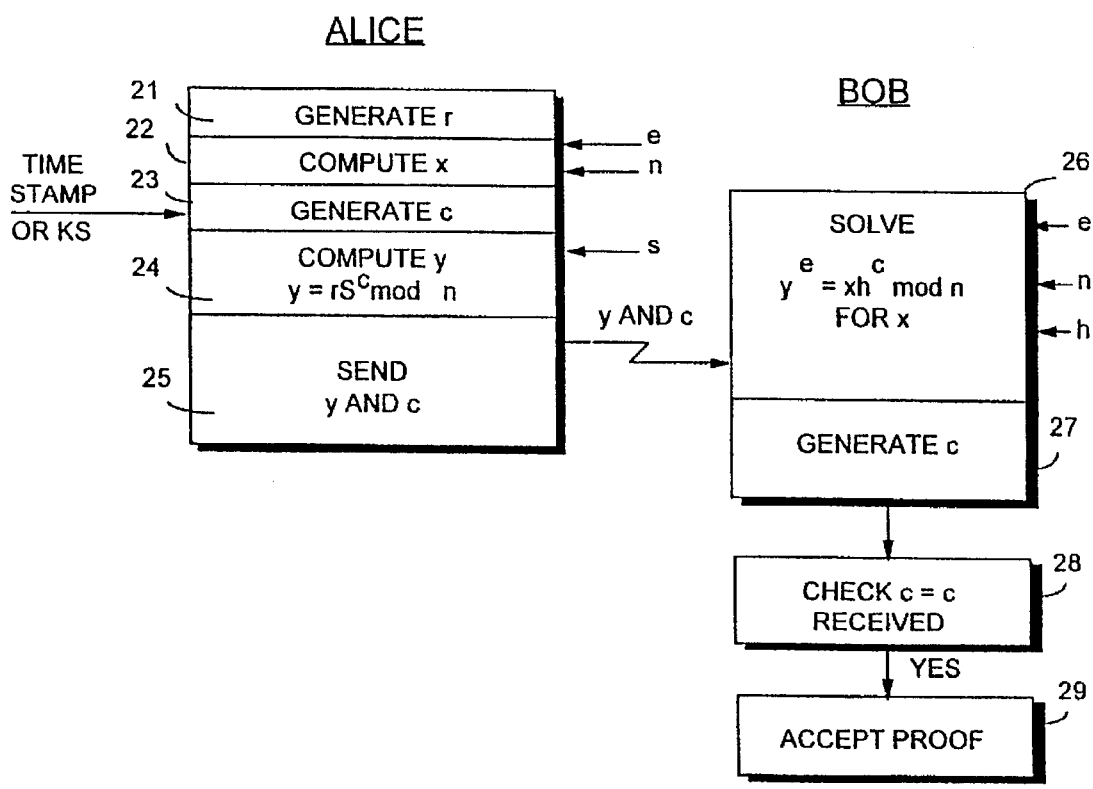
FIG. 3b is a flow chart illustrating a further non-interactive proof of knowledge protocol.

Non-interactive embodiments of the proof of knowledge protocol are illustrated in FIGS. 3a and 3b. The parameters for n, e, h and S are the same as above for the use with RSA signatures. In these non-interactive embodiments, Alice, without Bob's participation generates and computes the values x, y, c and sends x and y or c and y to Bob. Bob generates the value c in the same manner as Alice. In these embodiments, Bob is checking to see that Alice has correctly generated c. The non-interactive embodiments are advantageous in that they can be used in a store and forward environment such as electronic mail.

In the non-interactive embodiment of FIG. 3a, Alice and Bob both generate c in the same manner. The value of c is made dependent upon some non-repeating function such as a timestamp or the session key. Alice computes x and y and sends these values to Bob. Bob solves the equation of $y^e=xh^c$ mod n using his generated value for c and the received values of x and y. If the equality holds, then Bob accepts the proof. The procedure for Alice proving that she knows S, the signature on her certificate is illustrated in the flow chart of FIG. 3a.

11. Alice generates a random number r between 1 and n-1,
12. Alice computes $x=r^e$ mod n,
13. Alice generates a number c between 0 and e-1,
14. Alice computes $y=rS^c$ mod n,
15. Alice sends x and y to Bob,
16. Bob generates c in the same manner as Alice,
17. Bob checks that $y^e=xh^c$ mod n,
18. If so, Bob accepts the proof.

To keep Alice from cheating and choosing the value of c before x, which would enable Alice to provide a solution easily, the value of c is made dependent upon x, as for example through a hash function. In addition, to prevent replay, the value of c is made dependent upon some non-repeating function, such as a timestamp or the session key. Bob is required to generate c in the same manner that Alice generated c. Bob then checks that Alice has computed the value of c appropriately.

In the non-interactive embodiment of FIG. 3b, Alice generates and computes the values x, y and c and sends y and c to Bob. Bob then checks to see that Alice has properly generated c by comparing the received value c with the value of c resulting from his solving the equation of $y^e=xh^c$ mod n for x and computing c in the same manner as Alice. FIG. 3b illustrates the protocol as follows:

21. Alice generates a number r between 1 and n-1,
22. Alice computes $x=r^e$ mod n,
23. Alice generates a number c between 0 and e-1,
24. Alice computes $y=rS^c$ mod n,
25. Alice sends y and c to Bob,
26. Bob solves $y^e=xh^c$ mod n for x,
27. Bob generates c in the same manner as Alice,
28. Bob checks that his value for c equals the value of c received from Alice,
29. If so, Bob accepts the proof.

Again, the value of c generated by Alice is made dependent upon x, e.g., through a hash function, and some non-repeating function, such as a timestamp or the session key.

Encryption programs are used for the protection of information transmitted over private and public networks such as Internet and electronic banking systems. The programs are for installation in telephones, encryption cards, data bases and files.

The invention has been described using RSA signatures, but any certificate signature scheme can be used, as for example, DSA and Elgamal. Similarly, other techniques may be adapted, e.g., that of Fiat-Shamir which provide a proof of knowledge without transferring useful information (See Feige et al., "Zero-Knowledge Proofs of Identity", *Journal of Cryptology*, 1 (2): 77–94 (1988)) herein incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. A method of preventing certificate harvesting in a public key escrow system with verification of escrow protocol between communicating members comprising:

sending by a sending member an escrow verification string containing the sending member's public escrow key but not containing a certificate; and engaging in a proof of knowledge protocol with a receiving member to prove to the receiving member that said sending member has a valid certificate.

2. A method as in claim 1 wherein said proof of knowledge protocol is a zero-knowledge protocol.

3. A method as in claim 1 wherein said proof of knowledge protocol includes the steps:

a) generating, by the sending member, a random number r between 1 and n-1;

b) computing, by the sending member, a value x, where $x=r^e$ mod n;

c) sending x to the receiving member;

d) generating, by the receiving member, a random number c between 0 and e-1;

e) sending c to the sending member;

f) computing, by the sending member a value y, where $y=rS^c$ mod n;

g) sending y to the receiving member;

h) determining by the receiving member that $y^e=xh^c$ mod n; and i) if the equation is satisfied accepting that the sender has a valid certificate, wherein:
   n is the certifier's modulus;
   e is the public exponent of the certifier;
   h is the hash of the certificate body; and
   S is the signature on the certificate such that $h=S^e$ mod n.

4. The method in claim 3 including the step of repeating the proof of knowledge protocol.

5. The method of claim 1 including the step of encrypting the string with a current session key.

6. The method of claim 1 wherein said proof of knowledge protocol includes the steps of:

generating by the sending member;
   i) a number r and using r to compute a value x, where $x=r^e$ mod n, and
   ii) a number c and using r and c to compute a value y, where $y=rS^c$ mod n;

sending to the receiving member x and y or y and c; and determining by the receiving member, who generates c in the same manner as the sending member, using $y^e=xh^c$ mod n to verify the value of x or solve for x, respectively, that the value of c has been properly generated by the sending member wherein:
   n is the certifier's modulus;
   e is the public exponent of the certifier;
   h is the hash of the certificate body;

S is the signature on the certificate;

such that $h = S^e \bmod n$.

7. The method of claim 6 wherein the value of c is made dependent on x through a hash function.

8. The method of claim 7 wherein the value of c is made dependent on a non-repeating value.

9. The method of claim 7 wherein the value of c is made dependent on a timestamp.

10. The method of claim 7 wherein the value of c is made dependent on the current session key.

11. A public key escrow program embedded in a software product medium for communicating to a receiving program comprising:

an encrypting session key;

a law enforcement access field comprising the session key encrypted by an escrow key with both encrypted by a family key;

a verification string including the escrow key; and a sending member's components of a proof of knowledge protocol for establishing the proof of the sending member's certificate.

12. A public key escrow program as in claim 11 wherein the components of the proof of knowledge protocol include;

a routine for computing a value x where $x = r^e \bmod n$, and r is a random number, e is the public exponent of the certifier and n is the certifier's modulus;

and a routine for computing a value y where $y = r\, S^c \bmod n$, and S is the signature on the certificate and c is a random number provided by a receiving member.

13. A public key escrow program as in claim 11 wherein the components of the proof of knowledge protocol include:

a routine for generating a number r and a number c and a routine for computing a value x and a value y where $x = r^e \bmod n$, $y = rS^c \bmod n$ and c is made dependent on x and a non-repeating value, and e is the public exponent of the certifier, n is the certifier's modulus and S is the signature on the certificate.

14. A public key escrow program embedded in a software product medium for responding to communications from a sending program having a certificate comprising:

a routine for receiving a law enforcement access field and a verification string, for reconstructing a law enforcement access field from the received verification string, and for comparing the received law enforcement access field with the reconstructed law enforcement access field; and a routine with a proof of knowledge protocol for establishing the proof of the sending program's certificate.

15. A public key escrow program as in claim 14 wherein said routine with a proof of knowledge protocol includes interactive components for interacting with components in a proof of knowledge routine in the sending program.

16. A public key escrow program as in claim 15 wherein said routine interactive components include:

a subroutine for computing a random number c and for sending c to the sending program; and a subroutine for computing that $$y^e = xh^c \bmod n$$

where x and y are parameters provided by the sending program, e is the public exponent of the certifier of the certificate, n is the certifier's modulus and h is the hash of the certificate body.

17. A public key escrow program as in claim 14 wherein said proof of knowledge protocol comprises a routine for computing that $$y^e = xh^c \bmod n$$

where x and y are parameters received from the sending program, c is a parameter generated in the same manner as in the sending program, e is the public exponent and n is the modulus of the certifier of the certificate possessed by the sending program, and h is the hash on the body of the certificate.

18. A public key escrow program as in claim 17 wherein c is made dependent on x and a non-repeating value.

19. A public key escrow program as in claim 14 wherein said proof of knowledge protocol comprises a routine for computing the value of x from $$y^e = xh^c \bmod n$$

where y and c are parameters received from the sending program, e is the public exponent and n is the modulus of the certifier of the certificate possessed by the sending program, and h is the hash on the body of the certificate, and a routine for determining that the value of c generated from x in the same manner as in the sending program is the same as the value of c received from the sending program.

20. A public key escrow program as in claim 19 wherein c is made dependent on x and a non-repeating value.

\* \* \* \* \*